United States Patent
GopalaKrishnaSetty et al.

(10) Patent No.: US 10,521,381 B2
(45) Date of Patent: *Dec. 31, 2019

(54) SELF-MODERATING BUS ARBITRATION ARCHITECTURE

(71) Applicant: INTERNATIONAL BUSINESS MACHINES CORPORATION, Armonk, NY (US)

(72) Inventors: Raghu G. GopalaKrishnaSetty, Bangalore (IN); Venkatasreekanth Prudvi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/424,004

(22) Filed: May 28, 2019

(65) Prior Publication Data

US 2019/0278728 A1    Sep. 12, 2019

Related U.S. Application Data

(63) Continuation of application No. 15/073,080, filed on Mar. 17, 2016, now Pat. No. 10,303,631.

(51) Int. Cl.
   *G06F 13/366* (2006.01)
   *G06F 13/16* (2006.01)

(52) U.S. Cl.
   CPC ........ *G06F 13/366* (2013.01); *G06F 13/1605* (2013.01); *G06F 2213/0038* (2013.01)

(58) Field of Classification Search
   None
   See application file for complete search history.

(56) References Cited

U.S. PATENT DOCUMENTS

5,506,969 A   4/1996 Wall
5,862,355 A   1/1999 Logsdon
(Continued)

FOREIGN PATENT DOCUMENTS

KR   20050020233 A   3/2005
WO       8400220 A1   1/1984

OTHER PUBLICATIONS

Bystrov et al., "Priority Arbiters," Proceedings Sixth International Symposium on Advanced Research in Asynchronous Circuits and Systems (ASYNC 2000), Jan. 1, 2000, p. 128-137, Cat. No. PR00586.
(Continued)

*Primary Examiner* — Steven G Snyder
(74) *Attorney, Agent, or Firm* — Robert C. Bunker

(57) ABSTRACT

A method for self-moderating bus arbitration for access to a common bus is provided. The method may include receiving, by a bus arbiter, a request from a master device, wherein the received request includes a priority value set by the master device. The method may also include identifying the priority value from the received transaction request. The method may then include determining an insertion point within a priority table based on comparing the identified priority value to a table entry priority value associated with each table entry within the priority table. The method may further include inserting a new entry into the priority table based on the determined insertion point. The method may also include identifying a highest priority entry within the priority table. The method may then include serving the identified highest priority entry.

20 Claims, 7 Drawing Sheets

(56) References Cited

U.S. PATENT DOCUMENTS

| | | | |
|---|---|---|---|
| 5,881,313 | A | 3/1999 | Ramakrishnan |
| 5,905,877 | A | 5/1999 | Guthrie |
| 6,016,528 | A | 1/2000 | Jaramillo |
| 6,088,751 | A | 7/2000 | Jaramillo |
| 6,505,260 | B2 | 1/2003 | Chin |
| 6,571,306 | B1 | 5/2003 | Smith |
| 6,985,985 | B2 | 1/2006 | Moss |
| 7,035,277 | B1 | 4/2006 | Batcher |
| 7,095,752 | B2 | 8/2006 | Apostol |
| 7,096,292 | B2 | 8/2006 | Apostol |
| 7,096,293 | B2 | 8/2006 | Lee |
| 7,149,828 | B2 | 12/2006 | Hayashi |
| 7,243,179 | B2 | 7/2007 | Apostol |
| 7,284,080 | B2 | 10/2007 | Lin |
| 7,315,909 | B2 | 1/2008 | Lehongre |
| 7,349,424 | B2 | 3/2008 | Apostol |
| 7,454,546 | B1 | 11/2008 | Lilley |
| 7,461,190 | B2 | 12/2008 | Subramanian |
| 7,647,444 | B2 | 1/2010 | Dignum |
| 7,664,901 | B2 | 2/2010 | Riocreux |
| 7,752,366 | B2 | 7/2010 | Subramanian |
| 7,787,378 | B1 | 8/2010 | Lakhia |
| 7,797,467 | B2 | 9/2010 | Worrell |
| 7,908,416 | B2 | 3/2011 | Kato |
| 7,970,970 | B2 | 6/2011 | Subramanian |
| 8,260,993 | B2 | 9/2012 | Chen |
| 8,452,907 | B2 | 5/2013 | Riocreux |
| 9,600,426 | B2 | 3/2017 | Gyobu |
| 9,665,515 | B2 | 5/2017 | Seki |
| 10,303,631 | B2 | 5/2019 | Gopalakrishnasetty |
| 2001/0010066 | A1 | 7/2001 | Chin |
| 2001/0047435 | A1 | 11/2001 | Dove |
| 2003/0097505 | A1 | 5/2003 | Kato |
| 2003/0229744 | A1 | 12/2003 | Moss |
| 2005/0005050 | A1 | 1/2005 | Lin |
| 2005/0066093 | A1 | 3/2005 | Fuchikami |
| 2006/0149884 | A1 | 7/2006 | Saen |
| 2006/0155903 | A1 | 7/2006 | Soga |
| 2006/0212632 | A1 | 9/2006 | Apostol |
| 2006/0221931 | A1 | 10/2006 | Apostol |
| 2006/0253623 | A1 | 11/2006 | Katayama |
| 2007/0038791 | A1 | 2/2007 | Subramanian |
| 2008/0228977 | A1 | 9/2008 | Dignum |
| 2009/0055568 | A1 | 2/2009 | Subramanian |
| 2009/0157934 | A1 | 6/2009 | Kato |
| 2010/0088443 | A1 | 4/2010 | Riocreux |
| 2010/0115167 | A1 | 5/2010 | Tardieux |
| 2010/0153610 | A1 | 6/2010 | Kawashima |
| 2010/0235675 | A1 | 9/2010 | Subramanian |
| 2010/0325327 | A1 | 12/2010 | Marietta |
| 2011/0320660 | A1 | 12/2011 | Hara |
| 2012/0072631 | A1 | 3/2012 | Chirca |
| 2013/0246727 | A1 | 9/2013 | Nikon |
| 2014/0047147 | A1 | 2/2014 | Gyobu |
| 2018/0246828 | A1* | 8/2018 | Choi ............... G06F 13/16 |

OTHER PUBLICATIONS

El Guibaly, "Design and Analysis of Arbitration Protocols," IEEE Transactions on Computers, Feb. 1989, p. 161-171, vol. 38, No. 2.

IBM, "High-Speed Processor Bus Arbitration," IBM Technical Disclosure Bulletin, May 1, 1986, 7 Pages, No. NN86055329.

IBM, "VESA Local Bus Arbitration Scheme," IBM Technical Disclosure Bulletin, Apr. 1, 1995, 7 Pages, No. NN9504127.

Mell et al., "The NIST Definition of Cloud Computing," National Institute of Standards and Technology, Sep. 2011, p. 1-3, Special Publication 800-145.

IBM, "List of IBM Patents or Patent Applications Treated as Related (Appendix P)," Jun. 4, 2019, p. 1-2.

* cited by examiner

SELF-MODERATING BUS ARBITRATION ARCHITECTURE

BACKGROUND

The present invention relates generally to the field of computing, and more particularly to bus arbitration.

In typical system on a chip (SOC) processor environments, several master devices may be connected to a common bus. As such, there may be a conflict between master devices to obtain access to the common bus. Arbitration may be employed to allow efficient use of the common bus by resolving conflicts between master devices attempting to access the common bus at the same time.

SUMMARY

According to one exemplary embodiment, a method for self-moderating bus arbitration for access to a common bus is provided. The method may include receiving, by a bus arbiter, a request from a master device, wherein the received request includes a priority value set by the master device. The method may also include identifying the priority value from the received transaction request. The method may then include determining an insertion point within a priority table based on comparing the identified priority value to a table entry priority value associated with each table entry within the priority table. The method may further include inserting a new entry into the priority table based on the determined insertion point. The method may also include identifying a highest priority entry within the priority table. The method may then include serving the identified highest priority entry.

According to another exemplary embodiment, a computer system for self-moderating bus arbitration for access to a common bus is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving, by a bus arbiter, a request from a master device, wherein the received request includes a priority value set by the master device. The method may also include identifying the priority value from the received transaction request. The method may then include determining an insertion point within a priority table based on comparing the identified priority value to a table entry priority value associated with each table entry within the priority table. The method may further include inserting a new entry into the priority table based on the determined insertion point. The method may also include identifying a highest priority entry within the priority table. The method may then include serving the identified highest priority entry.

According to yet another exemplary embodiment, a computer program product for self-moderating bus arbitration for access to a common bus is provided. The computer program product may include one or more computer-readable storage devices and program instructions stored on at least one of the one or more tangible storage devices, the program instructions executable by a processor. The computer program product may include program instructions to receive, by a bus arbiter, a request from a master device, wherein the received request includes a priority value set by the master device. The computer program product may also include program instructions to identify the priority value from the received transaction request. The computer program product may then include program instructions to determine an insertion point within a priority table based on comparing the identified priority value to a table entry priority value associated with each table entry within the priority table. The computer program product may further include program instructions to insert a new entry into the priority table based on the determined insertion point. The computer program product may also include program instructions to identify a highest priority entry within the priority table. The computer program product may then include program instructions to serve the identified highest priority entry.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
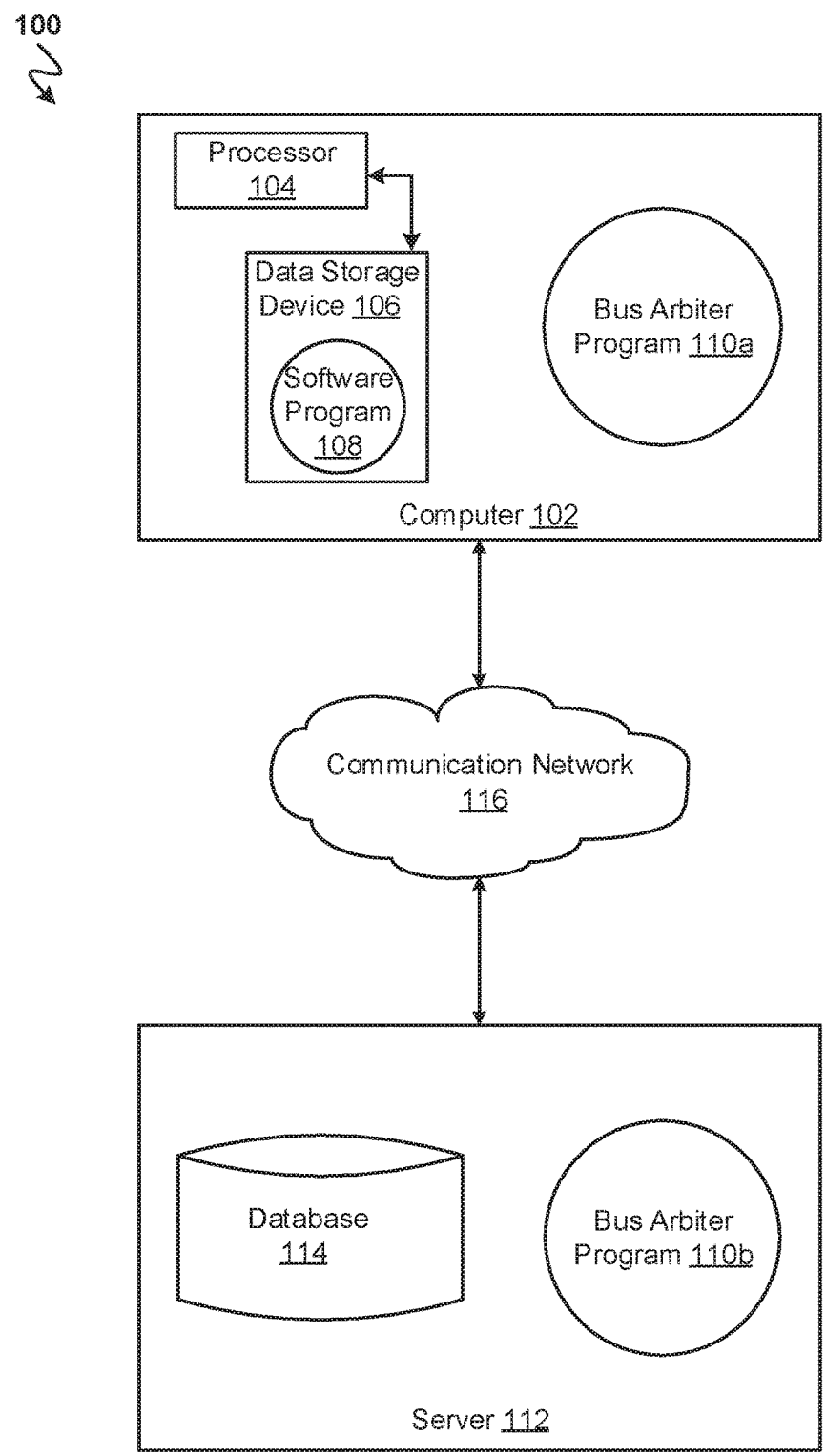
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for self-moderating bus arbitration. As such, the present embodiment has the capacity to improve the technical field of bus arbitration by utilizing master device-determined priority levels for each bus request. More specifically, master devices (e.g., memory controller) may set a priority level for each bus request and the bus arbiter may resolve bus request conflicts by employing a dynamically ordered request table based on the priority level assigned by the master devices.

As described previously, in typical system on a chip (SOC) processor environments, several master devices may be connected to a common bus. As such, there may be a conflict between master devices to obtain access to the common bus. Arbitration may be employed to allow efficient use of the common bus by resolving conflicts between master devices attempting to access the common bus at the same time.

Traditional arbitration schemes may include tokens (i.e., time slices) or pre-programmable/reprogrammable priority. Token-based arbitration may not be efficient due to the time taken for a master device to gain access to the common bus. Pre-programmable/reprogrammable priority may be utilized by one master device on the system and the priority is fixed once programming is complete which may lead to low priority data transfers from a single master device transmitted with a high priority and vice versa. These traditional arbitration schemes may allow situations when a low priority master device has a transaction that needs a higher priority than normal and yet be denied bus cycles since there are higher priority master devices floating transactions that may not be a higher priority at a given time. Therefore, it may be advantageous to, among other things, provide a way to arbitrate bus transactions on a per transaction basis by allowing master devices to set priorities for each transaction.

According to at least one embodiment, a self-moderating arbitration method may be added to any bus arbitration logic, whereby master devices decide on the priority of the data/frame that will be sent through a common bus. The priority, decided on-the-fly dynamically by the master device, may be sent with a transaction/request to the arbiter. The arbiter may maintain a priority table using a data structure, such as a linked list, to order bus transactions based on the priority assigned by the master device. Thus the master device may alter the priority of each individual bus transaction based on the nature of the data/frame.

For example, if a master device is sending a critical power-up/down request to the arbiter, the master device may set the priority for the request to ultra-high. Upon receipt of the ultra-high priority request, the arbiter may search the current priority table for all masters and prioritize the received ultra-high priority request based on a known ordering algorithm (i.e., determine where the received ultra-high priority request should be placed within the current priority table and insert the request therein). Additionally, the arbiter may add the master devices identifier (ID) to the table with the transaction request and priority. Multiple different priority requests (limited up to n) from the same master device may also be serviced by the arbiter based on known control schemes to prevent master devices from misusing the freedom to assign priority requests. For example, if the arbiter has set the maximum number of high priority requests from master device M0 to n, then the arbiter may not allow M0 to add n+1 high priority requests to the priority table at a single time. The arbiter may refuse the n+1 high priority request, alter the priority of the request (e.g., make the priority lower), or handle the request in some other manner.

If a high priority request comes from a low priority master device, the request may be floated with a higher priority and may compete with the highest priority transactions. Thereafter, collisions may be resolved by the arbiter using traditional methods. Alternatively, the arbiter may maintain a counter that can be tuned to restrict how often a low priority master device may be given access to sending high priority transactions. Since this counter may be tunable by the arbiter, if high priority transactions are received from low priority master devices, the high priority transactions may be placed in the priority table with a flag set to prevent low priority master devices from flooding the common bus. Thus, transactions from low priority master devices may be given priority cycles if necessary while ensuring other master devices are not prevented from using the common bus.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a bus arbiter program 110a. The networked computer environment 100 may also include a server 112 that is enabled to run a bus arbiter program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the bus arbiter program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the bus arbiter program 110a, 110b (respectively) to arbitrate conflicting bus requests based on ordering conflicts using transaction priorities set by master devices within the client computer 102 or a server computer 112. The bus arbitration process is explained in more detail below with respect to FIGS. 2-5.

Figure 2:
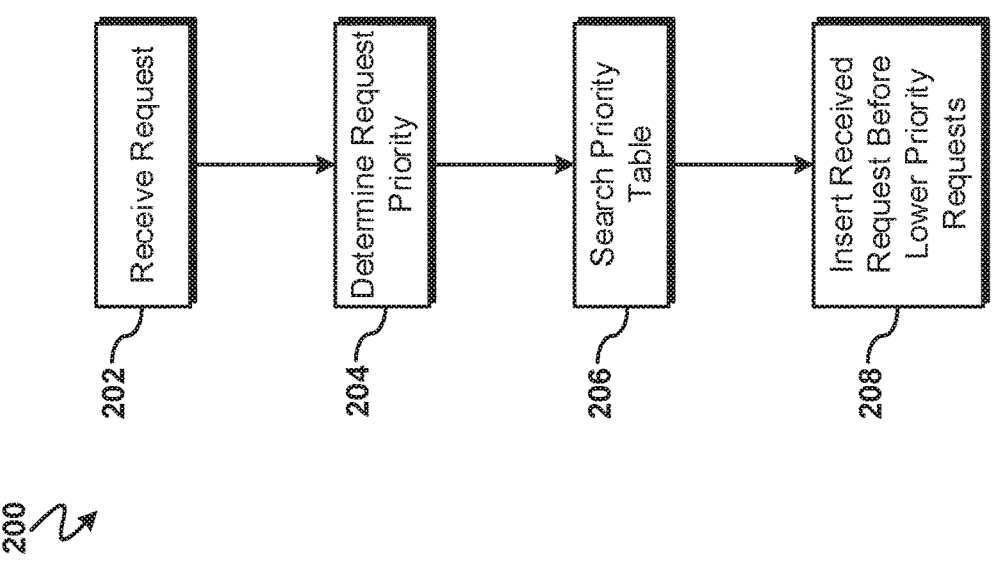
FIG. 2 is an operational flowchart illustrating a process for bus request insertion according to at least one embodiment.

Referring now to FIG. 2, an operational flowchart illustrating the exemplary bus request insertion process 200 used by the bus arbiter program 110a and 110b (FIG. 1) according to at least one embodiment is depicted.

At 202, the bus arbiter program 110a and 110b (FIG. 1) receives a bus request. According to at least one embodiment, the bus arbiter program 110a and 110b (FIG. 1) may receive transaction requests from master devices (e.g., processor local bus (PLB) masters that initiate bus transactions) to use the common bus. For example, a master device may send a critical power-up/power-down request to the bus arbiter. The bus request may include request data identifying a master device (e.g., a master identifier (ID) value) and the priority of the request (e.g., an integer) set by the master device generating the bus request.

Next, at 204, the priority of the received request is determined. According to at least one embodiment, the master devices may set the priority for each request. The priority set by the master device may be included with the data describing the bus request. Thus, the bus arbiter may decode the received request data to identify the priority value (e.g., an integer) in a predetermined position within the received request data. Continuing the previous example, the master may set the critical power-up/power-down request to 1 (where priority is indicated on a scale of 1 to 9, where 1 is the highest priority and 9 is the lowest priority) to indicate the importance of the request and include the priority value integer within a predetermined location in the request data. Furthermore, the master device initiating the request may be identified. The master device may be identified using a unique master ID value. The master ID may be included with the received request as a signal(s), within a data structure, or using some other architecture-dependent method.

Then, at 206, a current priority table is searched for existing requests with a priority that is less than the determined priority of the received request. According to at least one embodiment, the bus arbiter may maintain a current priority table that may be implemented as a linked list or some other data structure. The requests in the current priority table may be implemented as an entry corresponding to each request, whereby each request entry may include the master ID, the request priority, and, according to at least one embodiment, may further include the request type (e.g., rst, clk, etc.). Additionally, the current priority table may be ordered from highest priority transaction to lowest priority transaction, whereby the highest priority request entry may be the head of the linked list (or other data structure) having a head pointer indicating the highest priority request. The bus arbiter may insert transaction requests into the current priority table based on the priority value the master device assigned to the request, as will be described in detail below.

The bus arbiter may search the current priority table for any existing requests in the current priority table that have a priority that is less than the priority of the received request. The current priority table may be searched sequentially from the head (i.e., highest priority) until a lower priority request is identified or the end of the table (i.e., tail) is reached (thus indicating that no requests in the current priority table have a priority value less than the received request). If no current priority table exists, a table data structure may be initialized and have the received request added as the sole entry with the head pointer pointing to the received request at the head of the current priority table.

Next, at 208, the received request is inserted into the current priority table before lower priority requests. According to at least one embodiment, the bus arbiter may search for any requests in the current priority table having a lower priority than the received request and insert the received request before the request in the current priority table having the next lowest priority (i.e., the insertion point). If there are no requests in the current priority table having a lower priority than the received request, then the received request may be added to the end of the list (i.e., the tail) since the received request has the lowest priority among the requests within the current request table. Furthermore, by inserting the received request immediately before the first request in the ordered current priority table having lower priority than the received request, the received request may be inserted into the current priority table after all pending requests with the same priority as the received request. According to at least one implementation, insertion of a request into the current priority table may include creating a new entry having a master ID and the request priority value. Additionally, the new entry may be integrated into the data structure (e.g., linked list) storing the current priority table in the correct position (i.e., immediately in before the priority request having the next lower priority value).

For example, a current priority table may have two priority 1 requests followed by a priority 2 request that is then followed by two priority 3 requests. If a newly received transaction has a priority of 2 assigned by a master device, the bus arbiter may search the current priority table starting at the beginning of the table (i.e., the head where the highest priority request is located) until a request with a lower priority than the received request is found. Thus, the bus arbiter may compare the priority of the first request (i.e., priority value of 1) to the priority of the received request (i.e., priority value of 2). Since the first request has a higher priority than the received request, the bus arbiter may continue to the second request and make another comparison of priority values. After comparing the second request priority (i.e., priority value of 1) to the received request (i.e., priority value of 2), the bus arbiter will continue to the third request since the second request's priority is higher than the received request. The bus arbiter may then compare the third request's priority (i.e., priority value of 2) to the received request (i.e., priority value of 2) and move on to the fourth request since the priority of the third request equals the received request. Upon comparing the fourth request's priority value (i.e., 3) to the received request (i.e., priority value of 2), the bus arbiter will determine that the fourth request's priority is lower than the received request and insert the received request after the third request and before the fourth request. The inserted request may be an entry having the master ID of the requesting master (e.g., M0) and the priority value (i.e., 2).

Figure 3:
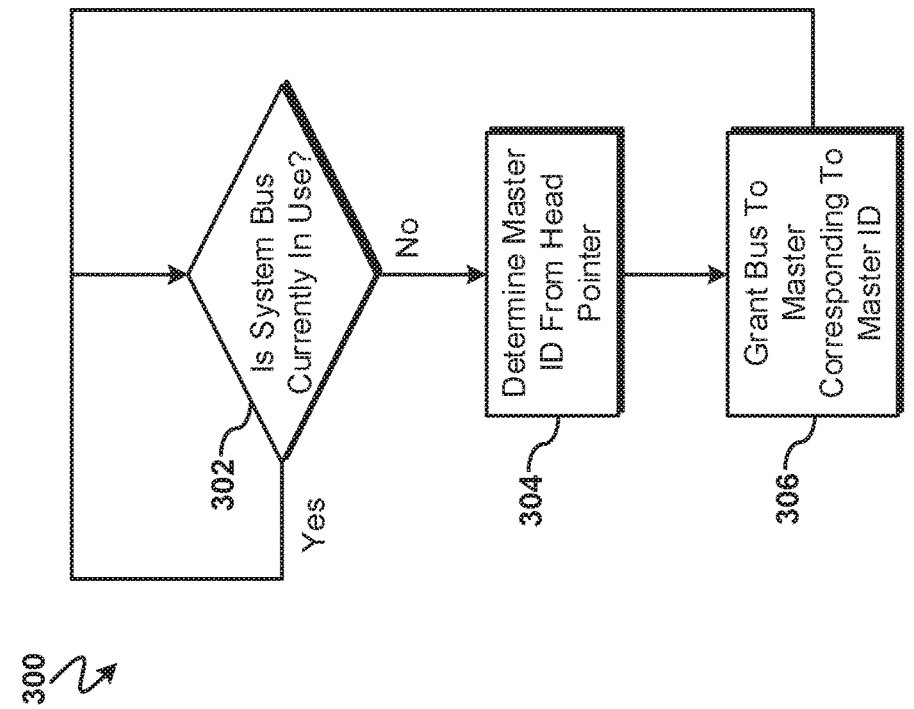
FIG. 3 is an operational flowchart illustrating a process for serving a bus request according to at least one embodiment.

Referring now to FIG. 3, an operational flowchart illustrating the exemplary bus request serving process 300 used by the bus arbiter program 110a and 110b (FIG. 1) according to at least one embodiment is depicted.

At 302, the bus arbiter program 110a and 110b (FIG. 1) determines if the system bus is currently in use. According to at least one embodiment, the status of the system bus (e.g., PLB) may be determined based on the architecture implementing the bus arbiter. For example, the bus arbiter may read a predetermined signal indicating bus use or, more specifically, if a bus read or write is occurring thus indicating that the bus is currently in use.

If the bus arbiter program 110a and 110b (FIG. 1) determined that the system bus is not currently in use at 302, then the bus arbiter program 110a and 110b (FIG. 1) determines the master identifier (ID) from the current priority table head pointer point at 304. According to at least one embodiment, the head pointer points to the highest priority request in the current priority table as described previously. Furthermore, the entry the head pointer is pointing to may include the master ID of the master device that made the request, as described previously. Thus, the master ID may be retrieved from the entry that the head pointer is pointing to within the current priority list. For example, if the current priority list head pointer is pointing to a table entry with a master ID of M0 and a priority value of 1, then the master ID M0 would be retrieved.

Next, at 306, the bus arbiter grants the master device corresponding to the master ID access to the common bus. According to at least one embodiment, the bus arbiter may look up the master device in a master device to master ID table or use some other data structure to identify the master device corresponding to the master ID based on the architecture using the bus arbiter program 110a and 110b (FIG. 1). Thereafter, the bus arbiter may grant bus access to the identified master device to serve the request. Additionally, the current priority table may be updated by removing the table entry corresponding to the served request and adjust the head pointer to point to the next entry within the current priority table.

Then, the bus request serving process 300 may return to continue monitoring the system bus to determine if the system bus is in use at 302 if a master device was granted bus access at 306 or if the bus arbiter program 110a and 110b (FIG. 1) determined that the system bus is currently in use at 302.

Figure 4:
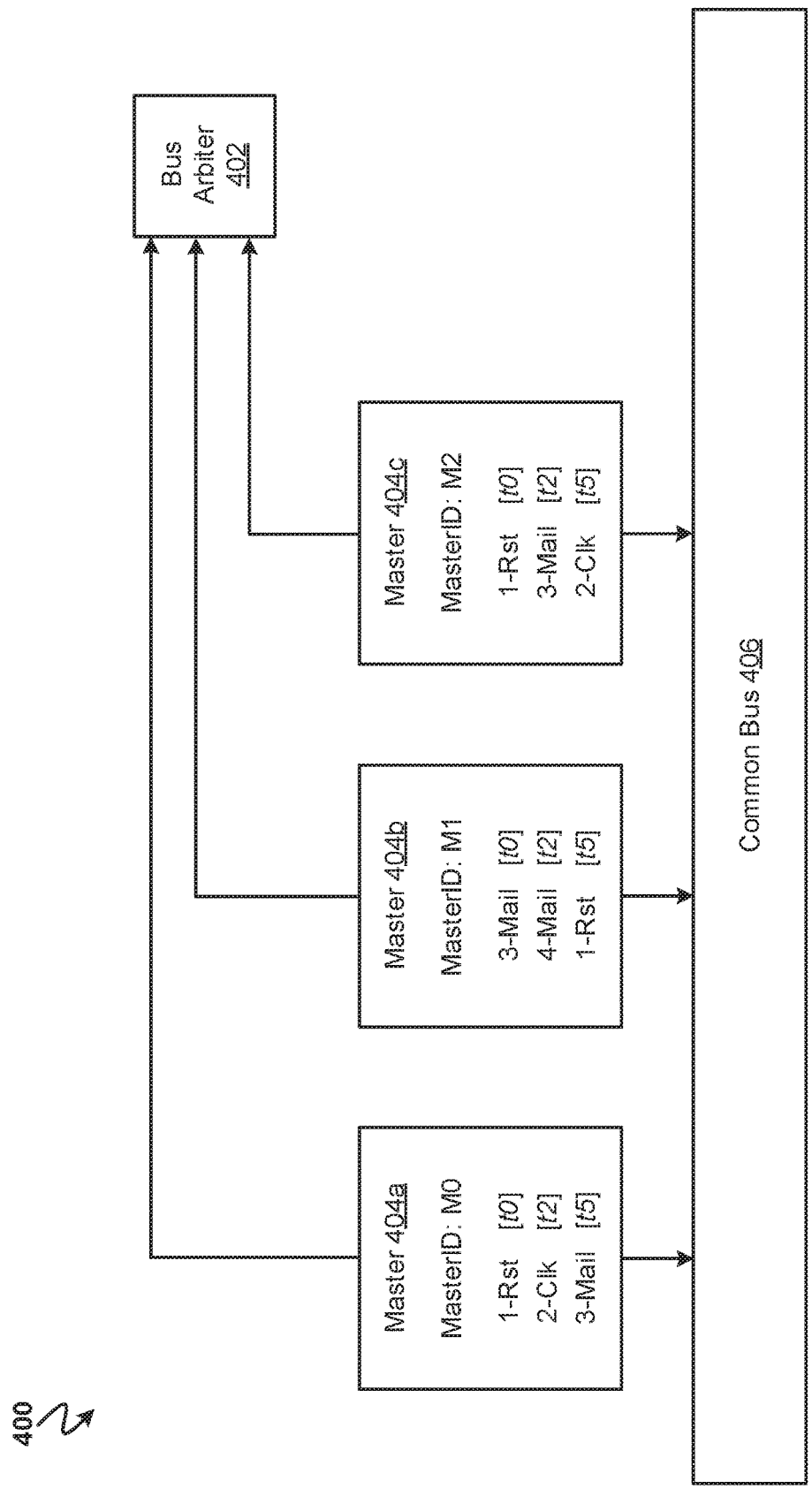
FIG. 4 is a block diagram of the bus arbiter architecture according to at least one embodiment.

Referring now to FIG. 4, a block diagram of a bus arbiter architecture 400 according to at least one embodiment is depicted. The bus arbiter 402 may receive transaction requests from master 404a (master ID M0), master 404b (master ID M1), and master 404c (master ID M2) for using the common bus 406 (i.e., system bus). The masters 404a-c may connect to the bus arbiter 402 using a priority bus for transmitting bus requests.

At time interval 0 (i.e., t0), master 404a may make a priority 1 rst request (i.e., reset activation request), master 404b may make a priority 3 mail request, and master 404c may make a priority 1 rst request. Thereafter, at time interval 2 (i.e., t2) master 404a may make a priority 2 clk request (i.e., main clock configuration request), master 404b may make a priority 4 mail request, and master 404c may make a priority 3 mail request. Finally, at time interval 5 (i.e., t5), master 404a may make a priority 3 mail request, master 404b may make a priority 1 rst request, and master 404c may make a priority 2 clk request. The bus arbiter 402 may handle the transaction requests as described above previously with respect to FIGS. 2 and 3 resulting in a current priority table that changes over time according to the illustration described below with respect to FIG. 5.

Figure 5:
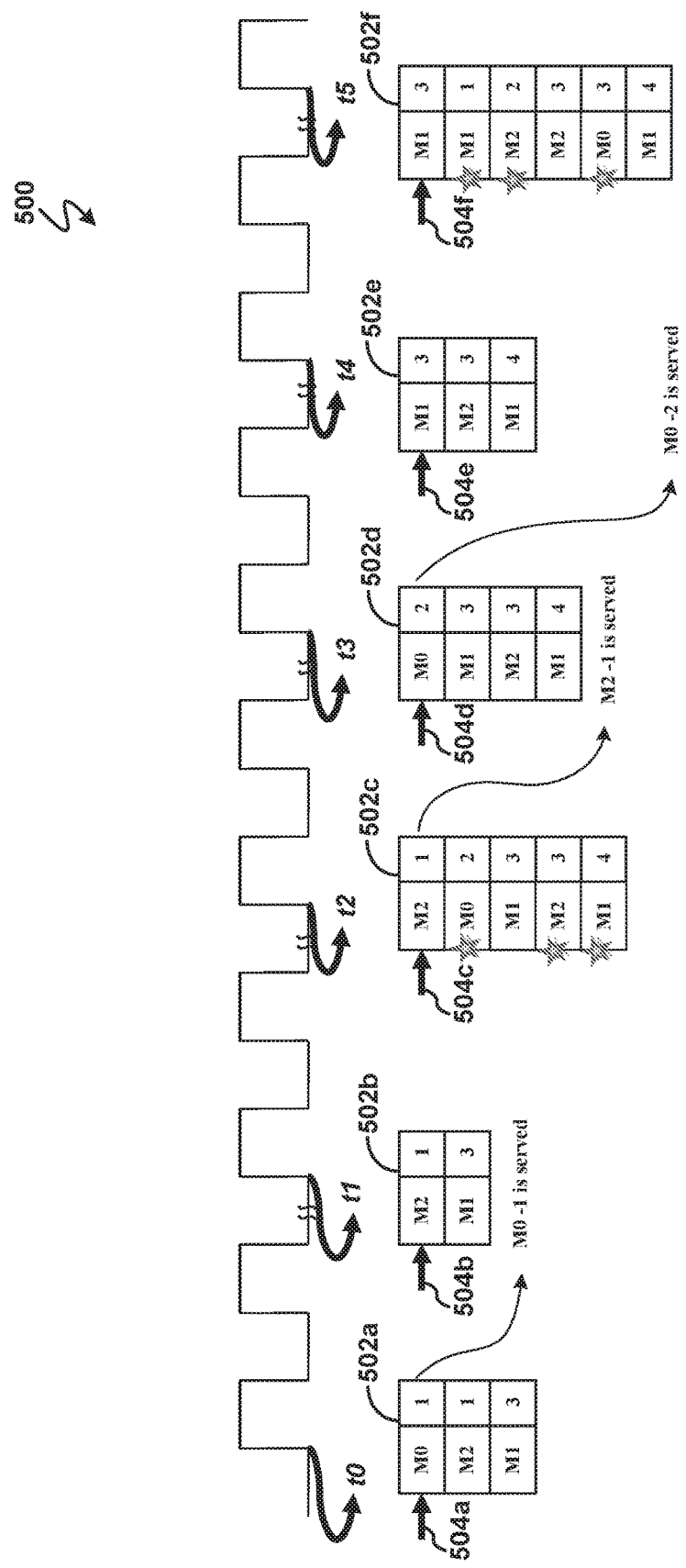
FIG. 5 is an example illustrating bus arbiter table changes over time according to at least one embodiment.

Referring now to FIG. 5, an example illustrating bus arbiter table changes over time 500 according to at least one embodiment is depicted. The current priority table 502a corresponding to time t0 depicts the first entry added to the current priority table 502a as a priority 1 rst request received from master 404a (FIG. 4) having a master ID of M0 according to the previously described step 208 (FIG. 2). Since the first entry (i.e., M0-1) has the highest priority and is at the head of the current priority table 502a, the head pointer 504a points to the first entry. Thereafter, the first entry is followed in the current priority table 502a by a priority 1 rst request from master 404c (FIG. 4) having a master ID of M2 which is then added as the second entry (i.e., M2-1) in accordance with step 208 (FIG. 2) described previously. The second entry is then followed by a priority 3 mail request from master 404b (FIG. 4) having a master ID of M1 that is added to the current priority table 502a according to previously described step 208 (FIG. 2). Thus, the current priority table 502a is ordered according to priority, from highest priority to lowest priority.

Next, at time t1, the highest priority request (i.e., the M0-1 request) that is identified by head pointer 504a in the current priority table 502a is served and removed according to FIG. 3, resulting in current priority table 502b. Additionally, the head pointer 504b is updated to point to the current first entry (i.e., M2-1) as described previously at 306 (FIG. 3).

Then, at time t2, the priority 2 clk request from master 404a (FIG. 4) is inserted as entry M0-2 into the current priority table 502c after entry M2-1 (received previously at time t0) according to the step described previously at 208 (FIG. 2). A priority 3 mail request from master 404c (FIG. 4) is then inserted as entry M2-3 after entry M1-3 (received previously at t0) according to the step described previously at 208 (FIG. 2). Finally, a priority 4 mail request from master 404b (FIG. 4) is inserted as entry M1-4 according to the step described previously at 208 (FIG. 2) after entry M2-3. Additionally, the M2-1 entry pointed to by head pointer 504c is removed from the current priority table 502c and served as described previously in FIG. 3, resulting in current priority table 502d corresponding to time t3. Additionally, the head pointer 504d is updated to point to the current first entry (i.e., M0-2) as described previously at 306 (FIG. 3).

At time t3, the highest priority request (i.e., M0-2) is served and removed from the head of the current priority table 502d as described previously in FIG. 3 resulting in current priority table 502e. Additionally, the head pointer 504e is updated to point to the current first entry (i.e., M1-3 ) as described previously at 306 (FIG. 3). At time t4, no additional requests are added to the current priority table 502e and thus the head pointer 504e remains unchanged.

Finally, at time t5, a priority 1 rst request from master 404b (FIG. 4) is received and added after the M1-3 entry since the request corresponding to the M1-3 entry is being processed as described previously in FIG. 3. A priority 2 clk request from master 404c (FIG. 4) is then inserted as entry M2-2 after the previously inserted M1-1 entry according to the step described previously at 208 (FIG. 2). Finally, a priority 3 mail request from master 404a (FIG. 4) is inserted as entry M0-3 between the M2-3 entry and the M1-4 entry according to the step described previously at 208 (FIG. 2). Since no requests were served and removed from the current priority table 502f, the head pointer 504f remains unchanged.

It may be appreciated that FIGS. 2-5 provide only an illustration of one embodiment and do not imply any limitations with regard to how different embodiments may be implemented. Many modifications to the depicted embodiment(s) may be made based on design and implementation requirements.

Figure 6:
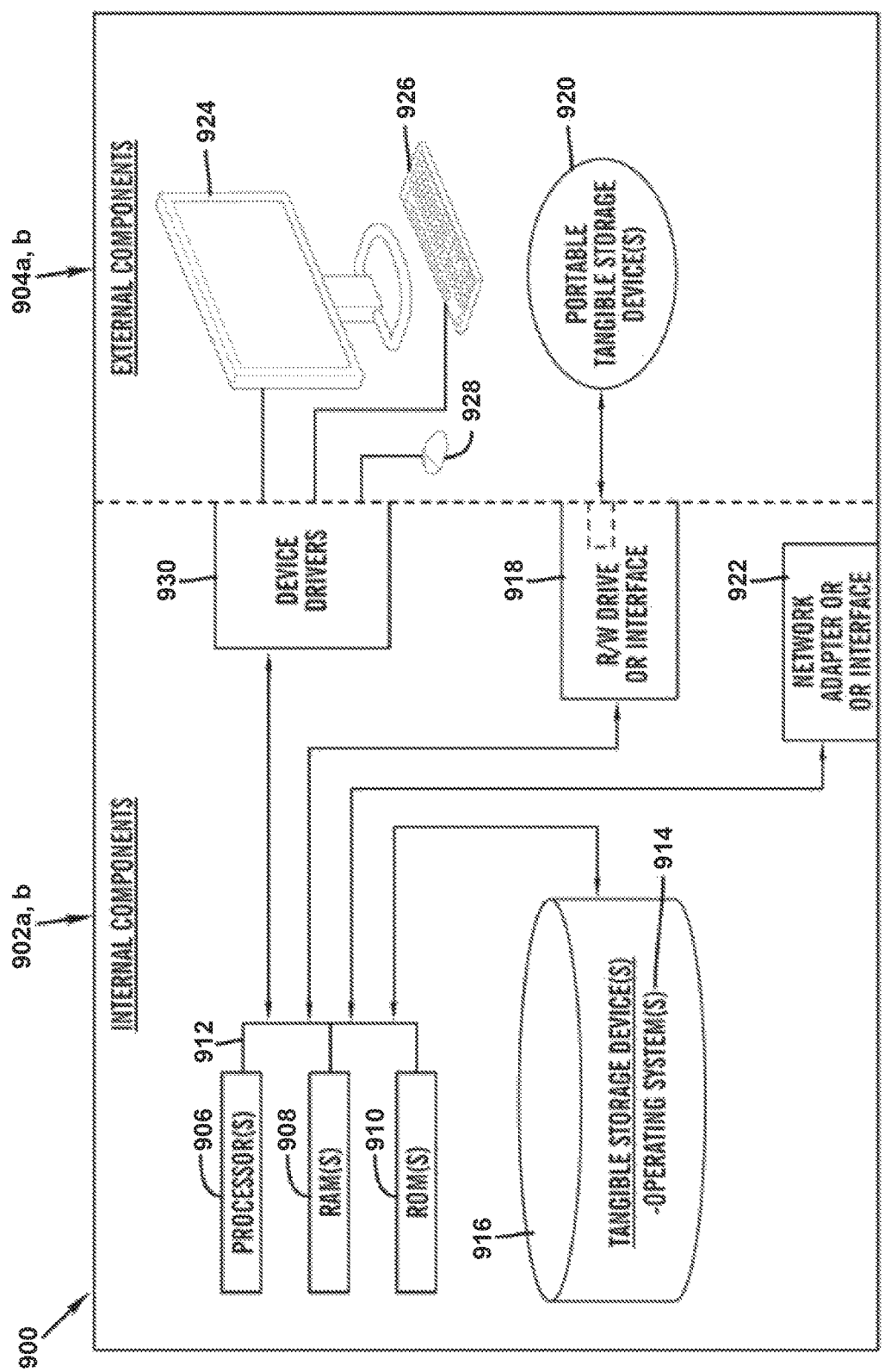
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 a, b and external components 904 a, b illustrated in FIG. 6. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914 and the software program 108 (FIG. 1) and the bus arbiter program 110a (FIG. 1) in client computer 102 (FIG. 1) and the bus arbiter program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the bus arbiter program 110a and 110b (FIG. 1) can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the bus arbiter program 110a (FIG. 1) in client computer 102 (FIG. 1) and the bus arbiter program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the bus arbiter program 110a (FIG. 1) in client computer 102 (FIG. 1) and the bus arbiter program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
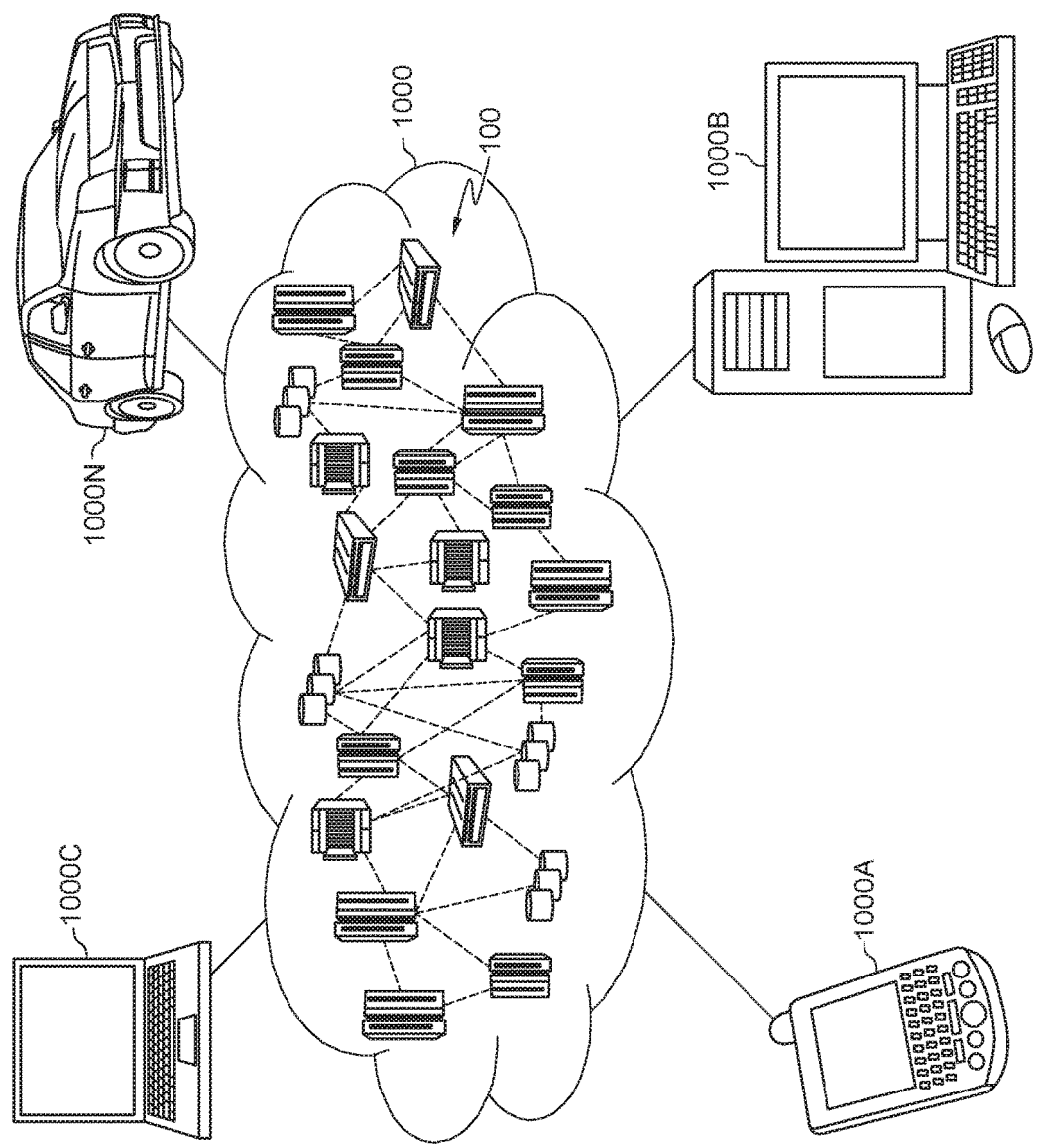
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
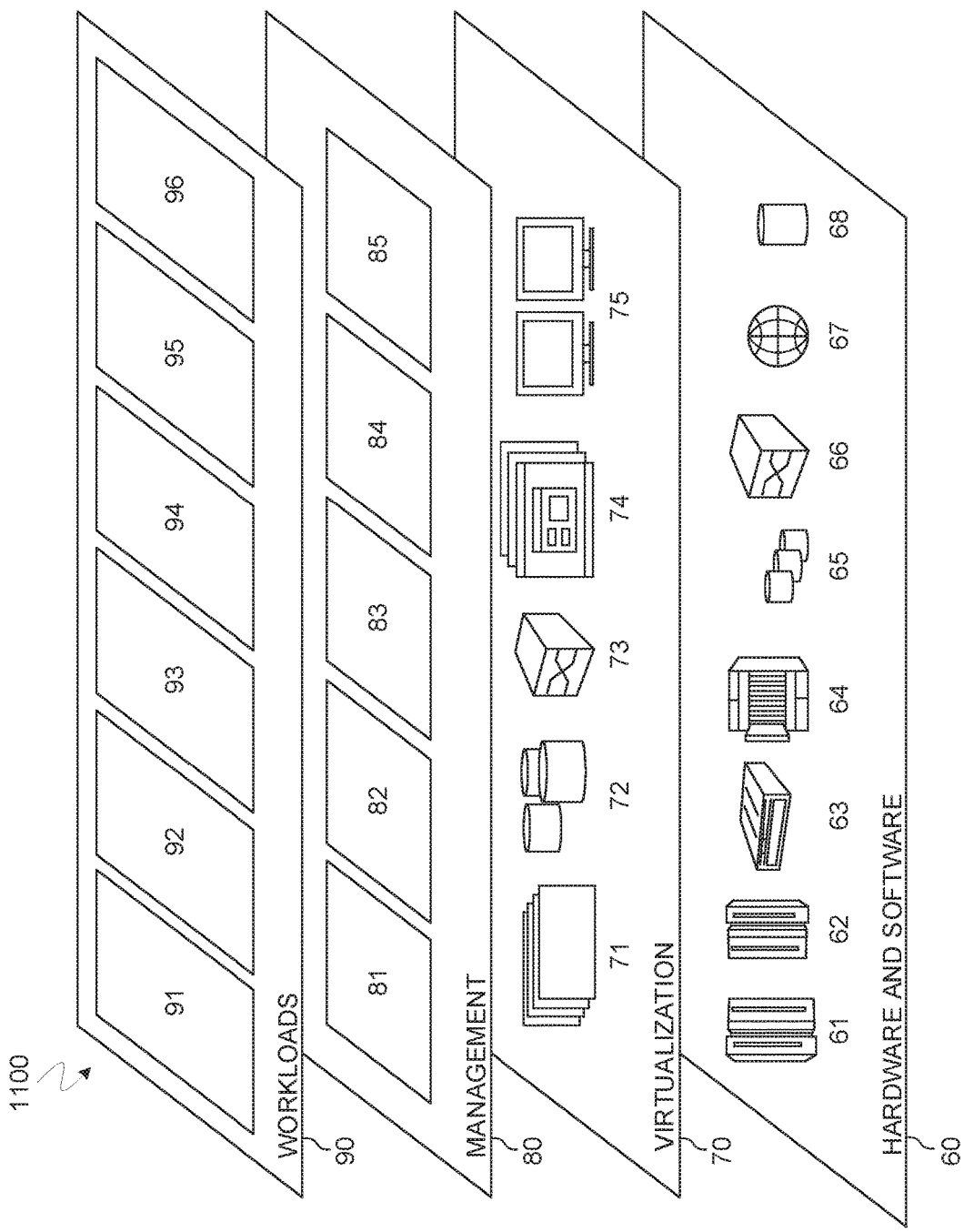
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-moderating bus arbiter 96. A self-moderating bus arbiter 96 provides a way to arbitrate conflicting bus transactions based on ordering conflicts using transaction priorities set by master devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for self-moderating bus arbitration for access to a common bus, the method comprising:
  receiving, by a bus arbiter, a request from a master device, wherein the received request includes a priority value set by the master device;
  identifying the priority value from the received transaction request;
  in response to determining that the master device is a low priority master and the identified priority value is a high priority, incrementing a counter representing a number of high priority requests made by low priority master devices accessing the common bus;

in response to determining that the high priority requests from the low priority master devices are preventing other master devices from accessing the bus, tuning the counter to allow the other master devices to use the common bus;

in response to determining that the tuned counter has exceeded a threshold number of high priority requests corresponding with the low priority master devices, performing an excessive use response;

determining an insertion point within a priority table based on comparing the identified priority value to a table entry priority value associated with each table entry within the priority table;

inserting a new entry into the priority table based on the determined insertion point;

identifying a highest priority entry within the priority table; and serving the identified highest priority entry.

2. The method of claim 1, wherein each table entry within the priority table is ordered from the highest priority entry to a lowest priority entry based on the table entry priority value associated with each table entry within the priority table.

3. The method of claim 2, wherein determining the insertion point within the priority table further comprises searching through the priority table based on the table entry priority value associated with each table entry within the priority table, from the highest priority entry to the lowest priority entry, and determining the insertion point to be immediately preceding a first table entry having with a first table entry priority value lower than the identified priority value.

4. The method of claim 1, wherein the received request further includes a master identifier (ID) corresponding with the master device, and wherein each table entry in the priority table includes a table entry master ID.

5. The method of claim 4, wherein serving the identified highest priority entry comprises identifying a highest priority master device associated with the identified highest priority entry based on a highest priority table entry master ID included in the highest priority entry and the bus arbiter granting the identified highest priority master access to the common bus.

6. The method of claim 1, further comprises determining that the common bus is not currently being used, and wherein identifying a highest priority entry within the priority table is done in response to determining that the common bus is not currently being used.

7. The method of claim 5, wherein serving the identified highest priority entry further comprises removing the highest priority entry from the priority table.

8. A computer system for self-moderating bus arbitration for access to a common bus, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving, by a bus arbiter, a request from a master device, wherein the received request includes a priority value set by the master device;

identifying the priority value from the received transaction request;

in response to determining that the master device is a low priority master and the identified priority value is a high priority, incrementing a counter representing a number of high priority requests made by low priority master devices accessing the common bus;

in response to determining that the high priority requests from the low priority master devices are preventing other master devices from accessing the bus, tuning the counter to allow the other master devices to use the common bus;

in response to determining that the tuned counter has exceeded a threshold number of high priority requests corresponding with the low priority master devices, performing an excessive use response;

determining an insertion point within a priority table based on comparing the identified priority value to a table entry priority value associated with each table entry within the priority table;

inserting a new entry into the priority table based on the determined insertion point;

identifying a highest priority entry within the priority table; and serving the identified highest priority entry.

9. The computer system of claim 8, wherein each table entry within the priority table is ordered from the highest priority entry to a lowest priority entry based on the table entry priority value associated with each table entry within the priority table.

10. The computer system of claim 9, wherein determining the insertion point within the priority table further comprises searching through the priority table based on the table entry priority value associated with each table entry within the priority table, from the highest priority entry to the lowest priority entry, and determining the insertion point to be immediately preceding a first table entry having with a first table entry priority value lower than the identified priority value.

11. The computer system of claim 8, wherein the received request further includes a master identifier (ID) corresponding with the master device, and wherein each table entry in the priority table includes a table entry master ID.

12. The computer system of claim 11, wherein serving the identified highest priority entry comprises identifying a highest priority master device associated with the identified highest priority entry based on a highest priority table entry master ID included in the highest priority entry and the bus arbiter granting the identified highest priority master access to the common bus.

13. The computer system of claim 8, further comprises determining that the common bus is not currently being used, and wherein identifying a highest priority entry within the priority table is done in response to determining that the common bus is not currently being used.

14. The computer system of claim 12, wherein serving the identified highest priority entry further comprises removing the highest priority entry from the priority table.

15. A computer program product for self-moderating bus arbitration for access to a common bus, comprising:

one or more computer-readable storage medium and program instructions stored on at least one of the one or more computer-readable storage medium, the program instructions executable by a processor, the program instructions comprising:

program instructions to receive, by a bus arbiter, a request from a master device, wherein the received request includes a priority value set by the master device;

program instructions to identify the priority value from the received transaction request;

in response to determining that the master device is a low priority master and the identified priority value is a high priority, program instructions to increment a counter representing a number of high priority requests made by low priority master devices accessing the common bus;

in response to determining that the high priority requests from the low priority master devices are preventing other master devices from accessing the bus, program instructions to tune the counter to allow the other master devices to use the common bus;

in response to determining that the tuned counter has exceeded a threshold number of high priority requests corresponding with the low priority master devices, program instructions to perform an excessive use response;

program instructions to determine an insertion point within a priority table based on comparing the identified priority value to a table entry priority value associated with each table entry within the priority table;

program instructions to insert a new entry into the priority table based on the determined insertion point;

program instructions to identify a highest priority entry within the priority table; and program instructions to serve the identified highest priority entry.

16. The computer program product of claim 15, wherein each table entry within the priority table is ordered from the highest priority entry to a lowest priority entry based on the table entry priority value associated with each table entry within the priority table.

17. The computer program product of claim 16, wherein determining the insertion point within the priority table further comprises searching through the priority table based on the table entry priority value associated with each table entry within the priority table, from the highest priority entry to the lowest priority entry, and determining the insertion point to be immediately preceding a first table entry having with a first table entry priority value lower than the identified priority value.

18. The computer program product of claim 15, wherein the received request further includes a master identifier (ID) corresponding with the master device, and wherein each table entry in the priority table includes a table entry master ID.

19. The computer program product of claim 18, wherein serving the identified highest priority entry comprises identifying a highest priority master device associated with the identified highest priority entry based on a highest priority table entry master ID included in the highest priority entry and the bus arbiter granting the identified highest priority master access to the common bus.

20. The computer program product of claim 15, further comprises determining that the common bus is not currently being used, and wherein identifying a highest priority entry within the priority table is done in response to determining that the common bus is not currently being.

* * * * *